United States Patent [19]

Hackelsberger

[11] Patent Number: 4,640,186
[45] Date of Patent: Feb. 3, 1987

[54] STEAM JUICE EXTRACTOR

[76] Inventor: Eberhard Hackelsberger, 8767 Wehr-Oflingen, Fed. Rep. of Germany

[21] Appl. No.: 734,383

[22] Filed: May 14, 1985

[30] Foreign Application Priority Data

May 19, 1984 [DE] Fed. Rep. of Germany ....... 3418729
Dec. 7, 1984 [DE] Fed. Rep. of Germany ....... 3444722

[51] Int. Cl.⁴ .............................................. A23N 1/00
[52] U.S. Cl. ...................................... 99/495; 99/483; 99/516; 126/369
[58] Field of Search .................. 99/495, 355, 319, 413, 99/410, 411, 412, 414, 449, 450; 126/369, 357, 367, 380, 377

[56] References Cited

U.S. PATENT DOCUMENTS

| 96,509 | 11/1869 | Totten | 126/369 |
| 111,067 | 1/1871 | Lane | 126/369 |
| 498,488 | 5/1893 | Power | 99/495 X |
| 2,368,141 | 1/1945 | Johnsson | 126/369 |
| 4,509,412 | 4/1985 | Whittenburg et al. | 126/369 X |

Primary Examiner—Timothy F. Simone
Attorney, Agent, or Firm—Michael J. Striker

[57] ABSTRACT

In a steam juice extractor having a water cup for producing a water steam, a juice collecting container arranged on the water cup and having a funnel and a fruit container having a bottom with a sieve openings for discharging a juice from the fruit container, an outlet of the funnel has a cross-section which is dimensioned so that the water steam discharges from the funnel with a speed of substantially between 2 and 20 m per sec.

13 Claims, 7 Drawing Figures

STEAM JUICE EXTRACTOR

BACKGROUND OF THE INVENTION

The present invention relates to a steam juice extractor and a method of steam juice extraction. More particularly, it relates to a steam juice extractor which has a water cup for producing a water steam, a juice collecting container arranged on the water cup and having a steam funnel, and a fruit container arranged on the juice collecting container and having a bottom which in the region of the steam funnel is closed and in the region surrounding the steam funnel is provided with sieve openings for discharging a juice from the fruit container. The juice extractor is also provided with a juice discharge conduit in the region of the bottom of the juice collecting container, and with a cover which closes the fruit container.

In the known steam juice extractors of the abovementioned type, the funnel which extends from the bottom of the juice collecting container centrally thereof has a conical cross-section so that it strongly narrows in an upward direction. It has an opening with the width of substantially between 50 and 65 mm, so that with a diameter of the water container of substantially between 32 mm and the heating on an electrical hearth plate with a power of 2 kw, the steam raising in the water cup from the boiling water discharges from the funnel with a speed which is equal at most to 1 m per second. The bottom of the fruit container located opposite to the outlet opening of the funnel is provided with a depression having a cross-section of quarter circle without sieve openings. The sieve openings are arranged in the bottom region which adjoins the outlet opening of the nozzle, and are also provided in the side wall of the fruit container till substantially one-third of its height from below.

The steam juice extraction is performed in the following manner. The water in the water cup boils as a spray during a boiling time prescribed in accordance with the desired recipe and generates a hot steam which raises through the conical funnel of the juice collecting container under the fruit container, it passes through the bottom and side surfaces of the fruit container between the fruits such as vegetables or herb plants and causes them or their cells to burst, so that their juice flows out, drips through the bottom perforations of the fruit container into the juice collecting container and is collected there. All fermentation germs and bacteria are destroyed by the hot steam whereas flavor, nutrient media and vitamins are retained in the juice. Then the juice is discharged in hot condition through the discharge pipe or plugged rubber hose by means of hose connection directly into the prepared bottles.

In the steam juice extractors of the above-described construction and operation, the juice extraction takes a considerable time which is connected with respectively high energy consumption.

SUMMARY OF THE INVENTION

Accordingly, it is an object of the present invention to provide a simple steam juice extractor which performs the juice extraction in short time with low energy consumption and with high output.

It is also an object of the present invention to provide a method of steam juice extraction which provides a high output in a short time with low energy consumption.

In keeping with these objects and with others which will become apparent hereinafter, one feature of the present invention resides, briefly stated, in a steam juice extractor which has a water cup for producing a water steam, a juice collecting container mounted on the water cup and having a steam funnel forming a steam passage, and a fruit container mounted on the juice collecting container and having a bottom which is closed in the region of the steam nozzle and provided in the surrounding region with a plurality of sieve openings for discharge of a juice from the fruit container, wherein the nozzle has an outlet with a cross-section dimensioned so that the water steam discharges from the nozzle with a speed of substantially between 2 and 20 m per sec. In particular, the speed can amount to 3-7 m per sec.

Another feature is a method of steam juice extraction in accordance with which the water cup, the juice collecting container with the steam nozzle, and the fruit container are arranged one above the other, and a water steam discharges from outlet of a funnel with a speed of between 2 and 20 m per sec.

When the steam juice extractor is designed and the steam juice extraction is performed in accordance with the applicant's invention so that the water steam discharges with a speed of substantially between 2 and 20 m per sec., this high speed leads to the fact that an intensive passage of the water steam between the fruits in the fruit container takes place and respectively cooling of the steam because of its high speed is respectively low along the path between the outlet of the funnel and the fruits in the fruit container. Because of the high speed of the water steam which in accordance with the present invention is at least double speed of the water steam obtained in the known steam juice extractors and preferably with a speed of 7 m per sec. which is ten times the value of the speed in the conventional steam juice extractors, a fast and thereby also fundamental juice extraction takes place. The juice extracted with the inventive extractor and method is better and more concentrated, since for juice extraction less water steam is produced and required and correspondingly less water is entrained in the juice.

The high speed also acts so that the steam penetrates better between the abutting surfaces of fruits or herb plants and thereby it provides a substantial total-surface action upon the fruits, herb plants or vegetables. Also, the steam with its high speed penetrates better into the pores of the fruit shells, and thereby contributes to their bursting open.

For obtaining the above-mentioned high speed the funnel has a diameter of substantially between 35–10 mm, and a respective cross-sectional area substantially from 962 to 78 mm$^2$.

Experiments have shown that fast and fundamental juice extraction is provided for various fruit types and herb plants when the funnel has a diameter of substantially between 35 and 20 mm, and a cross-sectional area of substantially between 962 and 314 mm$^2$ and thereby the water steam discharges with a speed of substantially between 3 and 5 m per sec., with boiling water in the water container with a temperature of substantially between 102° and 104° C. and a pressure of substantially 1.1–1.3 bar.

The narrowing of the funnel and its construction as a nozzle leads not only to a very high increase in the exit speed of the steam with maintenance of the speed in the region between the nozzle output and the fruits, but also to an increase and maintenance of the water steam temperature to 102°–104° C. and a pressure of 1.1–1.3 bar. The thus obtained temperatures which are above the evaporation temperature of 100° C. and the pressure of 1.1–1.3 bar leads to accelerated and fundamental juice extraction, since with this conditions of the water steam the water stream penetrates fast and efficiently all layers in the fruit container and treats all fruits in the fruit container with the hot steam substantially uniformly over their entire surfaces.

The inventive solution leads to simplification of a steam juice extractor. Since the water steam discharges with a considerably increased speed, increased temperature and increased pressure from the funnel which in accordance with the present invention can be simply formed as a steam jet nozzle, it suffices to provide the bottom of the fruit container with sieve openings through which the water steam can flow into the fruit container between the fruits upwardly. It is not necessary to provide the lateral walls of the fruit container also with sieve openings. Therefore, the inventive solution leads to the provision of a smaller number of sieve openings.

In accordance with another feature of the present invention a guiding and protecting body provided on the bottom of the fruit container extends into the funnel from above with formation of a ring-shaped gap therebetween.

It is important in this construction that the funnel of the juice collecting container has first a large cross-section and this outlet cross-section is then reduced as long as the fruit container is mounted on the juice collecting container and the guiding body provided on the bottom of the fruit container considerably narrows the outlet cross-section of the funnel, particularly when the guiding body extends into the funnel. When the fruit container is placed onto the juice collecting container, an annular nozzle is formed which produces a high value of the steam outlet speed of between 2 and 20 m per sec. with respectively high pressure of 1.1–1.3 bar. The narrowed nozzle is therefore available in the assembled juice collecting container and fruit container during the operation. When the housewife lifts the fruit container from the juice collecting container, the outlet cross-section of the funnel is automatically increased to such a dimension that the outlet speed instantaneously reduces to a low value and thereby is completely safe. This provides a simply safety measure in accordance with the applicant's invention.

It is not completely necessary to introduce the guiding and protecting body into the funnel. It is possible to form it so that it ends in a proximal region of the outlet opening of the nozzle, above the nozzle. It is important that in this arrangement in or in the close region to the outlet of the funnel, the outlet speed of the water steam is brought to the value of 2 m/sec. and more and with its displacement from the funnel, the outlet speed is lowered to a small safe value for example below 1 m/sec.

The guiding or protecting body performs an important task of guiding the water steam. Because of its presence and because of its shape the water steam is distributed uniformly over the bottom of the fruit container, the bottom being provided with sieve openings.

It is especially advantageous when the guiding and protecting body is formed of one piece with the bottom of the fruit container. Advantageously, it is formed in the center of the bottom and extends downwardly as a rounded dome. The bottom which circularly surrounds the body and is provided with the sieve openings is formed concave with a curvature opposite to the curvature of the dome and decreasing to the outer edge of the fruit container.

In accordance with another embodiment of the invention, the fruit container in its upper part has a diameter which corresponds to the diameter of the juice collecting container, and is provided in the region of its half height with a step which reduces this diameter so that a lower part is of a smaller diameter wherein the step is formed as a circumferential step with throughgoing openings provided therein.

Since the fruit container is provided with two portions of different diameters and the openings are arranged in the region of the transition between the smaller diameter and the greater diameter or in other words in the thus formed bottom of the upper portion, the fruits which lie in the upper portion of the fruit container are supplied with fresh steam so that as a result of this, a passage of the fresh air takes place in the lower region of the fruit container and also in the upper region of the fruit container. Therefore, a faster steam treatment of the fruits takes place, and in particular, steam treatment in the upper region is performed with a higher temperature than in the known extractors.

In general, the inventive steam juice extractor and the extraction method with its fast and effective steaming of the entire fruit container in connection with the shape of the juice collecting container and with a stronger action obtained with less water steam, a syrup with high concentration is produced which for many fruits, for example for cherries is sweeter. No or only small addition of sugar is needed.

In accordance with a further embodiment of the invention, the juice collecting container and also the fruit container are composed of a synthetic plastic material and advantageously of a synthetic plastic polypropylene. Because of this solution, not only both containers have a smaller weight but also a tight abutment of the containers nested over one another is provided. In the known steam juice extractors these containers were composed of enameled metal sheets having uneven outer surfaces which leads to untightness of nested parts resulting in escape of a greater part of the water steam.

In addition to the exact size accuracy, the juice collecting container and the fruit container composed of synthetic plastic material provide for a better insulation outwardly. As a result of this, the water cup can be formed in the inventive extractor with a considerably reduced volume. While in the steam juice extractors of the known construction and comparable filling volumes for the fruits to be treated a capacity of the water cup was 6 liter, this capacity in the inventive steam juice extractor is only 2.5 liter.

The inventive solution also leads to the fact that now the juice extraction takes place in a considerably shorter time. While in the known steam juice extractor one hour is required, in the inventive steam juice extractor the same volume of fruits requires only 30 minutes for juice extraction therefrom.

In a further embodiment of the invention it is proposed to provide in the bottom of the juice collecting container a plurality, particularly three funnels uniformly distributed over the surface of the bottom. The arrangement of the three funnels leads to improved uniformity of distribution of the water steam which discharges from the funnels with a speed of between 2 and 20 meter per second.

The guiding body provided on the bottom of the fruit container can be formed of one piece with the bottom of the latter. It is especially advantageous when the guiding body is mounted on the lower side of the fruit container. In accordance with a further proposal, several steam funnels can be provided, and the guiding bodies are formed as feet of the fruit container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
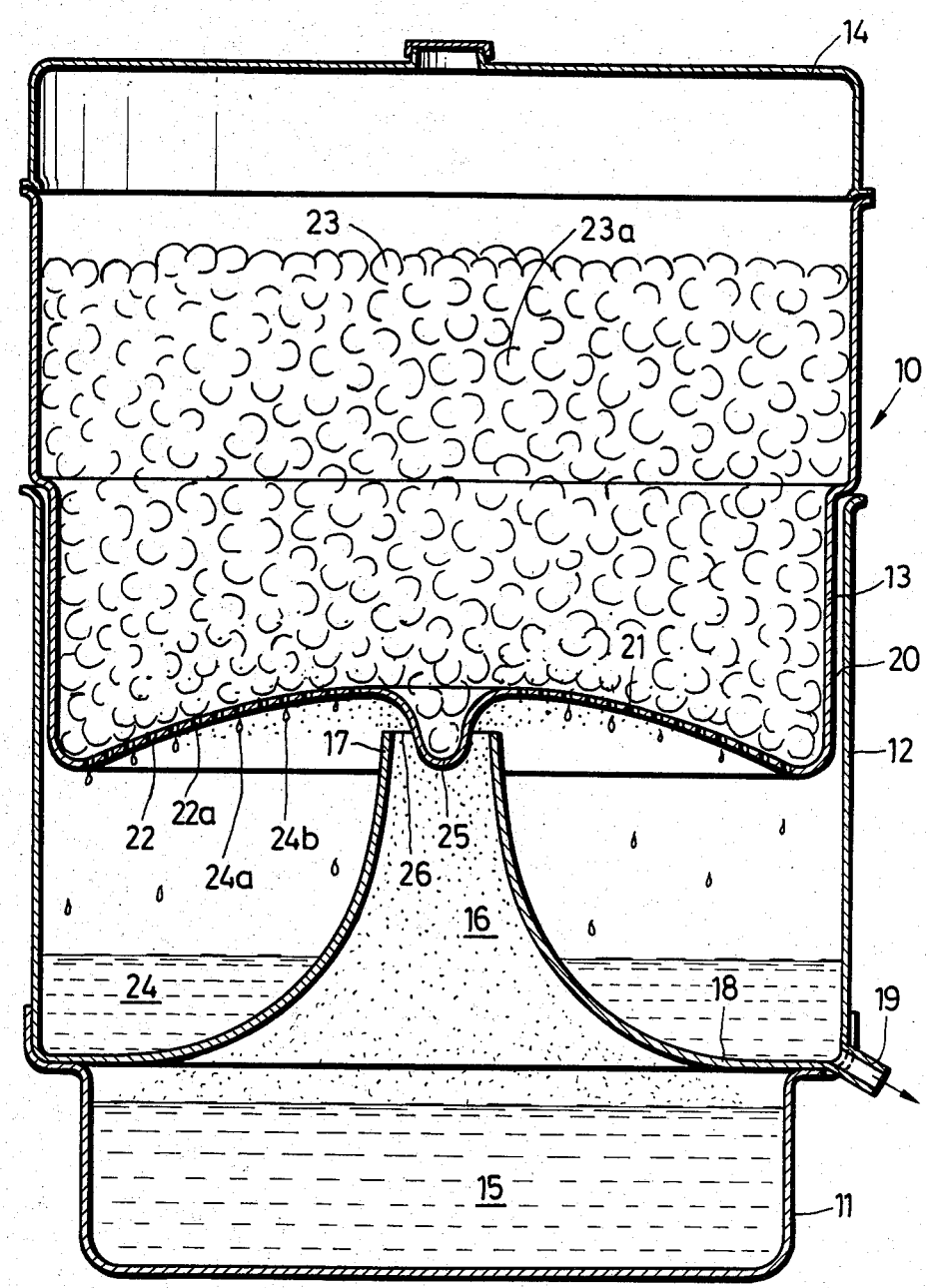
FIG. 1 is a view showing a vertical section of a steam juice extractor in accordance with the present invention.

A steam juice extractor in accordance with the present invention is identified as a whole with reference numeral 10 in FIG. 1. It has a water cup 11, a juice collecting container 12, a fruit container 13 and a cover 14. The water container has a diameter for example 320 mm. The surface of the water bath amounts to for example 800 cm$^2$.

A water 15 accommodated in the water cup 11 is brought to boiling by means of a heating plate with a diameter of for example 220 mm, and a power of for example 2 kw. It produces a steam 16 identified with points and passing through a funnel 17 which is formed on a bottom 18 of the juice collecting container 12 one-piece with the same.

A conventional juice discharging pipe 19 is provided at the edge of the bottom. The fruit container 13 has a lateral wall 20 and a bottom 21 provided with a plurality of sieve openings 22 and 22a. Thereby, the water steam 16 passes through the sieve openings into the fruit container 13 which accommodates fruits 23 and 23a, etc. A juice 24 flows from the juice container 20 in form of drops shown in the region of the sieve openings and identified with reference numerals 24a and 24b. A guiding and protecting body 25 is provided on the bottom 21 of the fruit container.

The construction shown in FIG. 1 has a funnel in form of a nozzle having an outlet formed as a ring and the guiding and protecting body 25 which performs the functions of a safety valve.

It is to be understood that the juice extractor in accordance with the present invention can be used without the guiding body which extends into the funnel at its outlet 26, when the funnel at its outlet 26 has a diameter of for example 35-10 mm, or a cross-sectional area of for example 962-78 mm$^2$, to obtain the speed of the water steam of for example 2-20 m/sec.

Figure 2:
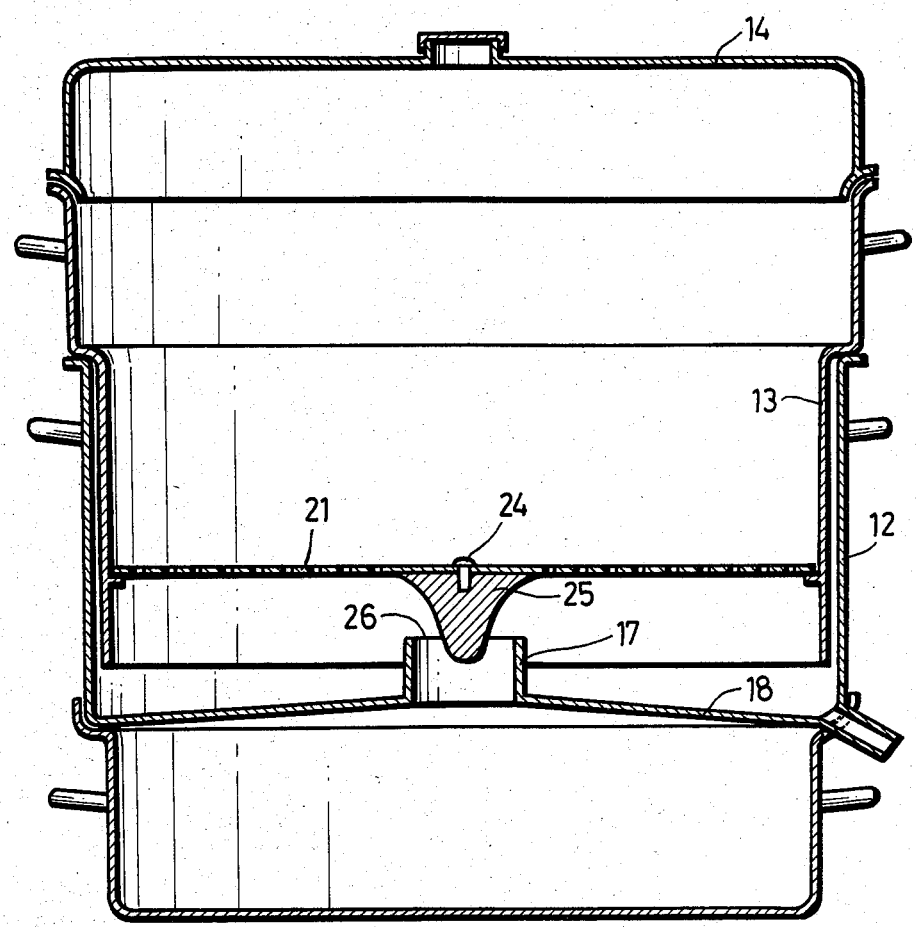
FIG. 2 is a view showing a vertical section of another embodiment of the steam juice extractor in accordance with the present invention.

FIG. 2 shows another embodiment of the steam juice extractor in accordance with the present invention. The bottom 18 of the juice collecting container 12 is flatter than the bottom in FIG. 1. Moreover, the funnel 17 is substantially cylindrical. The fruit container 13 has the bottom 21 which is inserted into it and formed flat. The guiding and protecting body 25 is mounted on the bottom 21 by means of a screw 24. In the position of use the body 25 extends into the outlet 26 of the funnel 17. In this embodiment also a ring outlet is provided so that when the guiding body 25 is lifted upwardly, the cross-section of the outlet of the funnel 17 is considerably increased and therefore the steam speed is reduced to its low and absolutely safe value.

Figure 3:
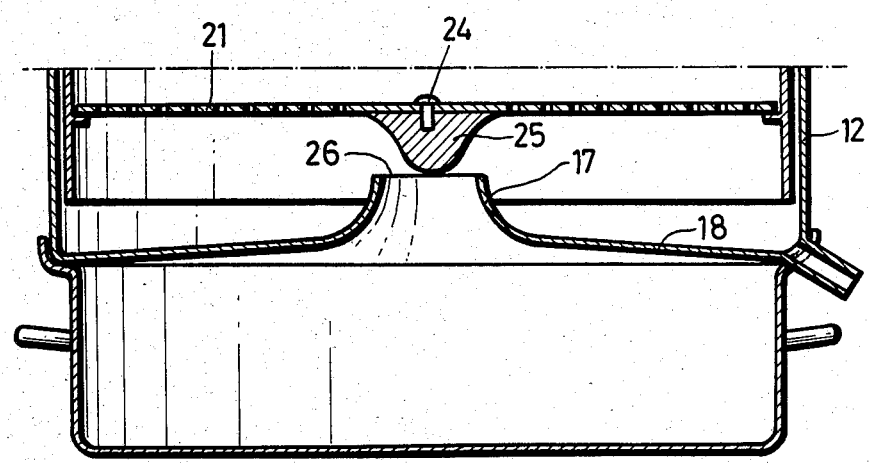
FIG. 3 is a view showing a partial section of a guiding and protecting body of the inventive steam juice extractor in accordance with yet another embodiment of the invention.

FIG. 3 shows an embodiment in which the guiding and protecting body 25 in the operative position extends from above to the outlet of the nozzle and thereby also performs its desired action.

Figure 4:
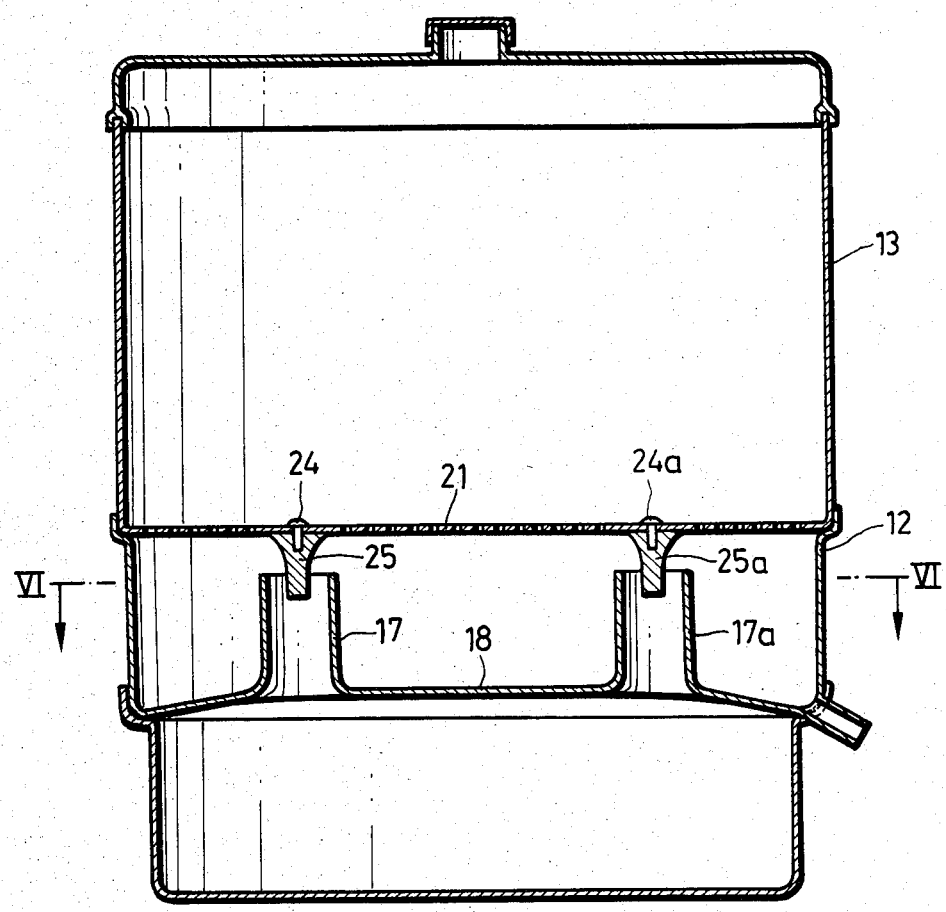
FIG. 4 is a view showing a vertical section of the inventive steam juice extractor in accordance with a further embodiment of the invention.
Figure 5:
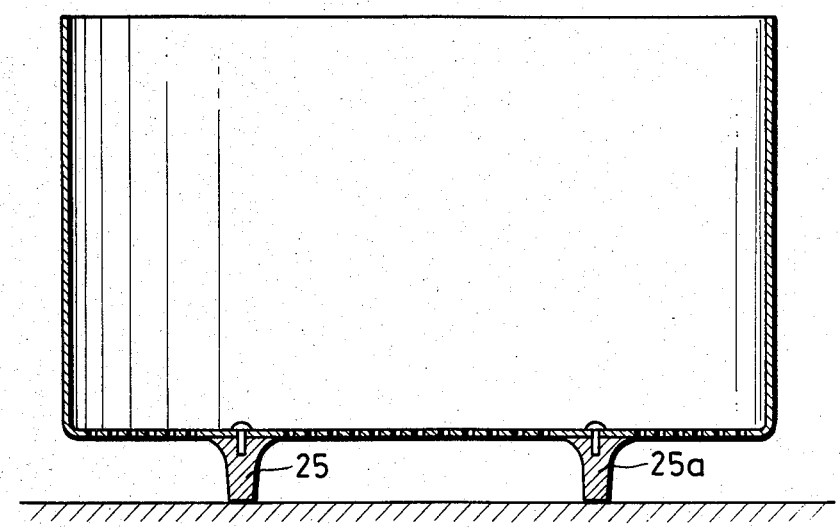
FIG. 5 is a fruit container of the steam juice extractor shown in FIG. 4.
Figure 6:
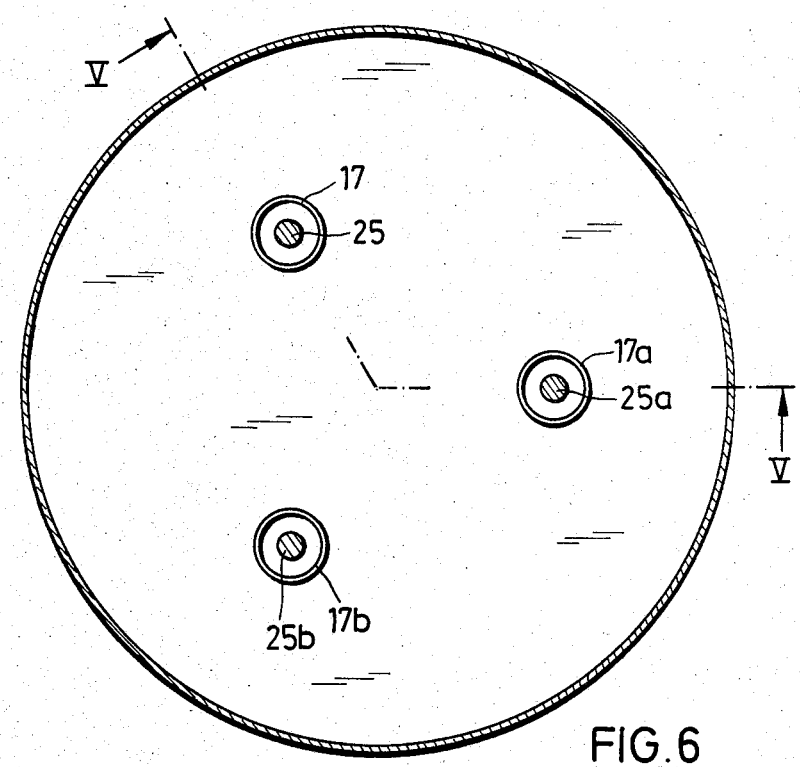
FIG. 6 is a horizontal section of the steam juice container of FIG. 4, taken along the line VI—VI.

FIG. 4 shows an embodiment in which several funnels 17 and 17' are provided on the bottom of the juice collecting container. Guiding bodies 25 and 25a extend into the nozzles 17 and 17a and are also mounted on the bottom 21 of the fruit container 13 by means of respective screws 24 and 24a. Since as shown in FIG. 1, the fruit container 13 does not have a lateral wall provided with sieve openings, the not shown parallelly extending walls of the container 12 and 13 can be formed with only a small height, in correspondence with the juice collecting container 12 shown in FIG. 3. FIGS. 5 and 6 show the fruit container separately. Here the guiding bodies 25 and 25a form the feet of the fruit container. As can he seen from FIG. 6, three guiding bodies 25, 25a and 25b are provided, and they engage in correspondingly associated funnels 17, 17a and 17b.

Figure 7:
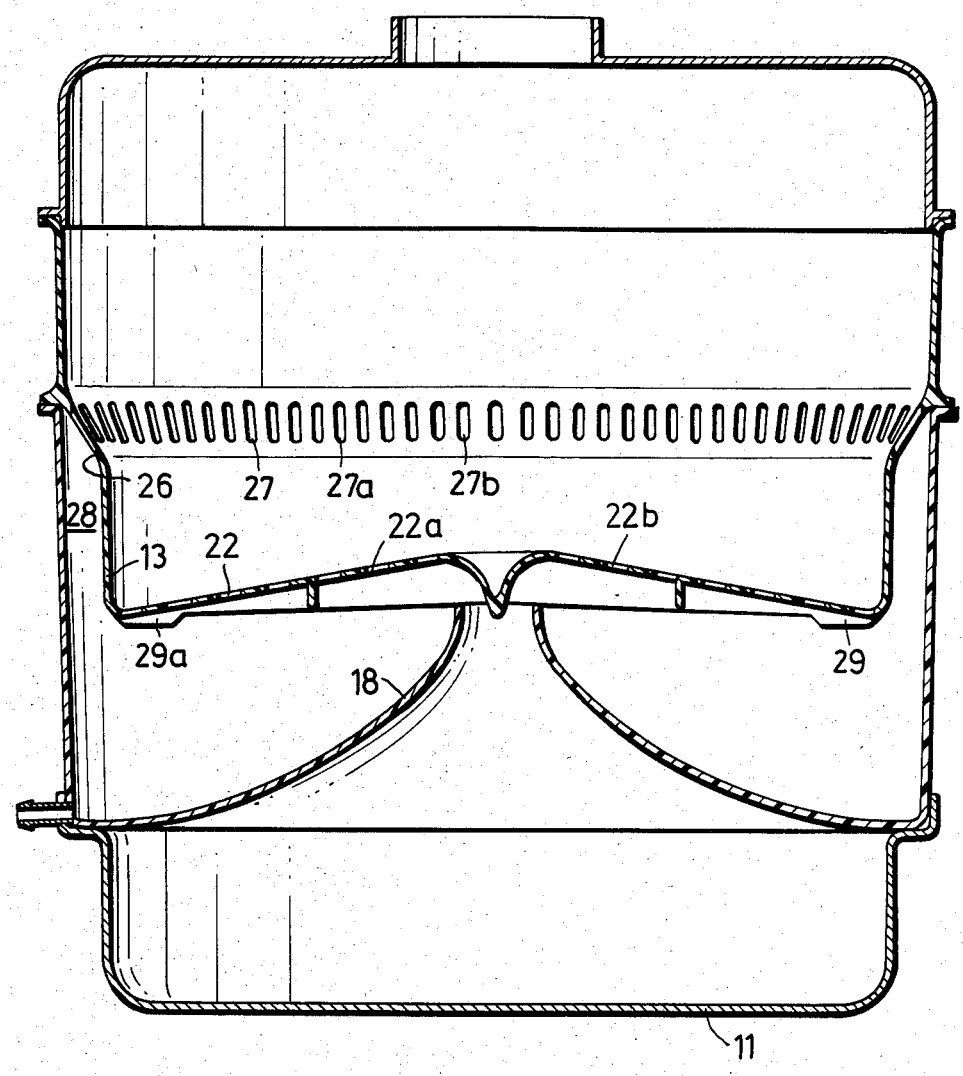
FIG. 7 is a view showing a vertical section of the steam juice extractor in accordance with still further embodiment of the present invention.

FIG. 7 shows a steam juice extractor with the water cup formed by a deformed metal sheet. The juice collecting container 18 is composed of a synthetic plastic polypropylene and formed as an extrusion-molded part. The fruit container 13 is also an extrusion-molded part of a synthetic plastic polypropylene. It is provided at its half-height with a step 26 which is formed by a wall portion inclined downwardly and inwardly. A plurality of a substantially vertical elongated perforations 27, 27a and 27b are arranged peripherally on the step. Since the lower region of the fruit container is of a smaller diameter than the upper region and thereby a sufficiently dimensioned annular gap 28 is formed between the lower region and the wall of the juice collecting container, the water steam passes through this annular gap 28 to the perforations 27, 27a and 27b so that it enters the fruit container directly in the upper region and acts as a fresh steam on the fruits located there.

It will be understood that each of the elements described above, or two or more together, may also find a useful application in other types of constructions differing from the types described above.

While the invention has been illustrated and described as embodied in a steam juice extarctor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A steam juice extractor, comprising a water cup for producing a water steam; a juice collecting container arranged on said water cup, said juice collecting container having a funnel for passing the water steam and being provided with an outlet; a fruit container arranged above said juice collecting container for receiving fruits and having a bottom which in the region of said funnel is closed and in the region surrounding said funnel is provided with a plurality of sieve openings through which the steam flowing through the funnel is introduced into said fruit container and the juice from fruits in said fruit container is dripped and flows into said juice collecting container; and a guiding and protecting body arranged on said bottom of said fruit container, said guiding and protecting body being arranged so that when said fruit container is arranged on said juice collecting container said guiding and protecting body cooperates from above with said funnel and reduces a cross section of said outlet of said funnel so that an annular opening remains for producing a high steam output speed, and when said fruit container is removed from said juice collecting container the whole cross section of said outlet of said funnel becomes unobstructed and thereby the outlet speed of the steam is lowered to a low and not dangerous value.

2. A steam juice extractor as defined in claim 1, wherein said guiding and protecting body is arranged so that it extends from above to the region near said funnel.

3. A steam juice extractor as defined in claim 1, wherein said guiding and protecting body extends into said funnel.

4. A steam juice extractor as defined in claim 1, wherein said funnel and said guiding and protecting body are formed so that when said fruit container is arranged on said juice collecting container the steam discharges through said annular opening between said funnel and said guiding and protecting body with a speed of at least 2 m per second, and when said fruit container is removed from said juice collecting container the steam discharges through the whole outlet of said funnel with a speed of at least 1 m per second.

5. A steam juice extractor as defined in claim 1, wherein said outlet of said funnel has a diameter of substantially 35 mm, said guiding and protecting body having in the region of said outlet of said funnel a diameter of substantially 15 mm.

6. A steam juice extractor as defined in claim 1, wherein said funnel in a plane of said outlet has a diameter of substantially 30 mm, said guiding and protecting body in a plane of said outlet of said funnel having a diameter of substantially 10 mm and extending into said funnel over a length of substantially 10 mm.

7. A steam juice extractor as defined in claim 1, wherein said outlet of said funnel is arranged centrally and substantially at a half height of said juice collecting container, said juice collecting container having a lower and outer peripheral edge and a bottom extending from said outlet of said funnel to said lower and outer peripheral edge with a circumferential concave curvature.

8. A steam juice extractor as defined in claim 1, wherein said fruit container has an outer edge, said guiding and protecting body being formed as a rounded dome arranged centrally of said bottom of said fruit container and extending downwardly, said bottom of said fruit container which is provided with said sieve openings extending from said body and being concave with a curvature which is opposite to the curvature of said body and decreases in direction from said body toward said outer edge of said fruit container.

9. A steam juice extractor as defined in claim 1, wherein said fruit container has an outer edge and is provided at said outer edge with a plurality of feet having a relatively small height and defining a standing surface for said fruit container extending in a predetermined plane, said guiding and protecting body having a lower tip which is offset upwardly by a relatively small distance from said plane of said standing surface of said feet.

10. A steam juice extractor as defined in claim 1, wherein said fruit container has an upper part with a diameter corresponding to said juice collecting container, a lower part with a diameter which is smaller than the diameter of said upper part, and a ring-shaped step provided substantially at a half height of said fruit container and having a plurality of perforations.

11. A steam juice extractor as defined in claim 10, wherein said ring-shaped step is formed as a circumferential wall which is inclined downwardly and directed inwardly.

12. A steam juice extractor as defined in claim 1, wherein said juice collecting container and said fruit container are composed of a synthetic plastic material.

13. A steam juice extractor as defined in claim 12, wherein said juice collecting container and said fruit container are composed of a synthetic plastic polypropylene.

* * * * *